3,010,201
PROCESS FOR FABRICATING A CENTRIFUGE
FOR HANDLING MOLTEN GLASS
Robert M. Woodward, Newark, Ohio, assignor to Owens-Corning Fiberglas Corporation, a corporation of Delaware
No Drawing. Filed Dec. 29, 1958, Ser. No. 783,171
1 Claim. (Cl. 29—529)

This invention relates to a process for fabricating a centrifuge for handling molten glass and similar materials, and in particular to a method for the fabrication of such a centrifuge which is employed for the formation of relatively heavy streams of molten glass and their projection into an attenuating blast of a hot gaseous medium moving at high velocity which attenuates the streams into fine glass fibers having diameters in the order of, say, .00025 inch or less.

Centrifugal fiber forming processes and apparatus therefor have been disclosed in patents such as U.S. Patent No. 2,609,566, and others. Briefly stated, a centrifugal fiber forming process comprises the steps of introducing a stream of molten glass at a temperature well above its liquidus temperature into a rotating centrifuge. The rotating centrifuge is provided with stream forming means such as orifices in or at its periphery so that centrifugal force acting upon the mass of molten glass in the centrifuge forces the glass to flow through these orifices and slings molten streams outwardly therefrom. Such a centrifugal fiber forming process usually employs an annular blast of air, steam, combustion products, or other gaseous medium, which blast surrounds the centrifuge and has a temperature substantially above room temperature, high velocity and high kinetic energy. The streams of glass are projected outwardly into the blast and the kinetic energy of the blast shreds or further attenuates the glass streams to form fine fibers.

One of the most widely employed types of centrifuge has a generally cylindrical peripheral wall supported by an upper conical wall which extends inwardly toward and is removably connected to a suitably mounted quill. The quill is usually rotated on a vertical axis at high speed and the stream of molten glass is poured downwardly through the hollow center of the quill. The centrifuge may have a return lip at the lower edge of its generally cylindrical wall to lend integrity to the structure and to resist outward deformation of the cylindrical wall by centrifugal force. The generally cylindrical wall of the centrifuge through which the orifices are drilled or otherwise formed may be cone-shaped upwardly or downwardly a few degrees, or it may be a true cylinder. Advantages have been urged for each of these several shapes and for modifications of these shapes. In the center of a centrifuge of this type, there is a distributor which receives the stream of molten glass and distributes it over the inner surface of the periphery of the centrifuge in an annular body, the annular body forming the mass of glass which is subjected to centrifugal force and from which the streams are flowed through the orifices.

Such a device must be operated at a temperature at least above the minimum attenuating temperature of the glass to be formed into fibers and usually at a temperature above the liquidus temperature of the glass. The liquidus temperatures of commercially available glasses which may be utilized for rotary fiber forming processes are in the range of, say, 1600–2100° F. Because of such high temperature, precious metals and precious metal alloys have been used as the material from which such centrifuges are formed. Precious metals and precious metal alloys have the advantage of not being severely eroded or corroded at these temperatures, but they cannot withstand the tremendous centrifugal forces encountered at operating speeds high enough to handle glass at commercial volume, say 3000 to 3100 r.p.m. with a centrifuge about 8" in diameter, and rather quickly distort and become useless.

Centrifuges of this type having an average diameter of about 8" and with a vertical, generally cylindrical face approximately 1¼" high, have been fabricated from stainless steel. In order to achieve commercial fiber-production rates, from 3000 to 4500 stream forming orifices are drilled through the generally cylindrical face of such a centrifuge. When used in a commercial rotary fiber forming process, with glass at a temperature of about 1850° F. and a throughput of about 300 pounds of glass per hour, per centrifuge, stainless steel centrifuges of this type had an average useful life of about 25 to 30 hours. At the end of this time the centrifuge face was so badly distorted that the holes had lost their stream forming capability.

It is an object of this invention to provide a method for the fabrication of a centrifuge for use in such a rotary fiber forming process wherein alloys of specific type are treated by specific steps to produce a finished centrifuge having superior qualities resulting in an average operating life of over one hundred twenty hours under conditions in which a stainless steel centrifuge lasts only about 25–30 hours.

The method of the invention contemplates not only the utilization of a metal alloy of a certain type but also a certain method of fabrication which brings out the superior qualities of the selected alloy and produces a product particularly designed for the purpose discussed above and particularly effective for that purpose. The method of the invention includes the use of a nickel-chromium alloy as the material from which the centrifuge is formed. In general, a combination of nickel and chromium constitutes from about 58 percent to about 79 percent of the alloy with nickel comprising from about 60 to about 66 percent of such combination. The remainder of the alloy employed in the method of the invention consists of about 0.4 to 0.6 percent carbon, about 1.0 to 1.15 percent silicon, about 1 percent manganese and about 1 to 6 percent of molybdenum and/or tungsten with the remainder iron. Molybdenum and tungsten, either alone or in combination, is or are particularly effective for strengthening the alloy employed in the method of the invention for producing rotary process centrifuges. This component of the alloy, which may be either molybdenum or tungsten, or a mixture thereof, will be described herein as a strengthener which includes at least one element from group VI–A of the periodic table having an atomic number of 42 to 74, i.e., tungsten, or a mixture of the two.

The terms "percent" and "parts" are used herein and in the appended claim to refer to percent and parts by weight, unless otherwise indicated.

In general, an alloy of the type indicated above may be cast in the shape desired. In an exemplary commerical installation, the diameter of the outside surface of the centrifuge periphery averages approximately 8" and this face extends vertically about 1¼ inches. The peripheral wall of the centrifuge is supported by a conical return flange extending from its upper edge inwardly and upwardly toward a mounting lip about 1" wide and having an inner diameter of about 4". A conical return flange about 1" wide extends radially downwardly and inwardly from the lower edge of the peripheral wall of the centrifuge. In order to properly resist the tremendous centrifugal forces created by rotation of such a centrifuge at speeds in the order of 300 r.p.m. or more, it has been found desirable to form the upper conical return wall of the centrifuge thicker than the lower portions of the peripheral wall. For example, the conical return wall and the upper part of the peripheral wall may be ¼" thick and the peripheral wall may taper to a thickness of approximately ⅛" at its bottom with the bottom return flange also being about ⅛" thick.

After formation of the centrifuge blank according to the description just above, the blank is machined to fit the mounting flange on a 4" quill, but the stream forming orifices are not drilled until a subsequent point in the fabrication process.

If the casting technique is employed for forming centrifuges according to the invention, the alloy is poured at a temperature somewhat higher than its melting temperature. As will appear in the examples set forth below, the alloys of metals utilized in the process of the invention have melting points in the range of, say, 2300–2450° F. and they are poured at a temperature in the order of, say, 2820–2850° F. Care should be taken to assure a melt of uniform composition prior to casting, so that all parts thereof are of a composition as set forth above.

After the centrifuge blank is poured, cooled and machined for mountability upon the quill, it is given a heat treatment at 1800° F. for twenty-four hours, followed by an air quench. The alloy as cast has a dendritic nework of complex carbides in an austentic matrix of Ni, Cr, Fe, and a strengthener as described. The twenty-four hour heat treatment partially breaks down the primary carbides of the network. The air quenching step precipitates secondary carbides. This may be called homogenizing the alloy.

Following the air quenching, the centrifuge blank is placed in a drilling machine which drills the 3000 to 4200, or more, stream forming orifices raidally inwardly through the 1¼" high peripheral face of the centrifuge, the orifices being drilled in a plurality of circumferentially extending rows and being spaced relatively uniformly over the face of the centrifuge so as to emit streams of glass from the mass of glass in the annular body collected on the inner surface of the peripheral wall of the centrifuge.

After the stream forming orifices are drilled, and the holes are deburred, the centrifuge is subjected to a second heat treatment at a temperature only slightly less than its melting point, say in the order of from 2250–2300° F., for one hour, for stabilizing the alloy and imparting about 5 to 10 percent ductility at room temperature. Alloys of the type utilized in the process according to the invention upon test are found to have a hardness of about 87 to 90 Rockwell B.

*Example I*

An alloy of the following formulation is melted.

| Metal | Percent by Weight | Combination Nickel-Chromium, percent |
|---|---|---|
| Ni | 52.0 | 65.9 |
| Cr | 26.79 | 34.1 |
| Fe | 78.79 | 100.0 |
| Fe | 12.96 | |
| C | 0.56 | |
| Si | 1.06 | |
| Mn | 1.02 | |
| W | 5.61 | |
| | 100.00 | |

The molten alloy is poured in a shell mold to form a centrifuge blank having an upwardly conical periphery with about 2½ degrees angle, a substantially vertical peripheral face having an extent of 1⅛" and a thickness of ⅛," the outside diameter of the face at its lower edge being 8⅛" and at its upper edge being 8". The upper edge of the peripheral wall blends into an upwardly and inwardly extending conical return wall approximately ¼" thick and angling inwardly at 20–22 degrees from the outer face. The conical wall of 1⅝" width terminates in a horizontal flat lip 3½" in diameter at its inner edge and 4¾" in diameter at its outer edge.

At the lower edge of the peripheral wall there is an inwardly coned return lip approximately 1" wide and extending at an angle of 20 degrees from the face. The cooled cast centrifuge blank is machined at the horizontal flange to fit a mounting flange for a rotary quill. The centrifuge blank is then subjected to a first heat treatment at 1800° F. for twenty-four hours followed by an air quench.

Upon photomicrographic examination it is found that the complex, dendritic primary carbides of the casting have been modified. The blank is then drilled to provide 4200 stream forming holes through its peripheral wall in ten circumferential rows of 420 holes each. After drilling the interior surface of the peripheral wall is deburred. The drilled centrifuge blank is then subjected to a second heat treatment at 2250° F. for one hour and followed by an air quench. After this second heat treatment, photomicrographic examination reveals a partial spheroidization and agglomeration of carbides. The more rounded carbide structure improves room temperature ductility as mentioned. Under conventional test, the centrifuge is found to have about 5–10 percent ductility at room temperature.

Several centrifuges of the same size have been produced according to the just described method and operated in commercial rotary fiber forming apparatus with conventional glass at temperatures of between 1875° F. and 1900° F. The inner surface of the peripheral wall was subjected to the molten glass and the outer surface to a slightly oxidizing atmosphere. As examples, four such centrifuges had usable commercial lives of 120, 130, 130 and 150 hours, respectively, and of the several hundred which have been cast and operated, several had over 200 hours of usable life.

*Example II*

A second group of centrifuges is fabricated according to the invention duplicating in all respects the method of Example I, except that the second heat treatment is performed at a temperature of 2300° F. for one hour. The second group of centrifuges is fabricated from an alloy having the following composition:

| Metal | Percent by Weight | Combination Nickel-Chromium, percent |
|---|---|---|
| Ni | 35.3 | 60.1 |
| Cr | 23.5 | 39.9 |
| Fe | 58.8 | 100.0 |
| Fe | 37.46 | |
| C | 0.42 | |
| Si | 1.15 | |
| Mn | 1.0 | |
| Mo | 1.0 | |
| | 100.0 | |

*Example III*

A third group of centrifuges is fabricated according to the invention, and according to the steps of Example 1, except for a variation in the one hour heat treatment, the third group being heat treated at about 2275° F., from the following alloy:

| Metal | Percent by Weight | Combination Nickel-Chromium, percent |
|---|---|---|
| Ni | 40.0 | 62.5 |
| Cr | 24.0 | 37.5 |
| | 64.0 | 100.0 |
| Fe | 28.5 | |
| C | 0.5 | |
| Si | 1.0 | |
| Mn | 1.0 | |
| Mo | 2.0 | |
| W | 3.0 | |
| | 100.0 | |

Centrifuges made according to Examples II and III are similarly installed in commercial fiber forming apparatus and have average lives in the order of 125 hours when subjected to the same conditions as those to which the centrifuges fabricated according to Example I were subjected.

In contrast to the substantial operating lives of centrifuges fabricated according to the invention, six centrifuges of identical size and shape, and operated in the same commercial rotary process forming apparatus under identical conditions, but fabricated from a stainless steel alloy comprising 25% Cr, 20% Ni, 2.0% Mn, 1.5% Si, 0.25% C, balance Fe, had useful commercial lives of 25, 25, 26, 27, 28 and 28 hours, respectively.

The greatly improved commercial lives of centrifuges fabricated according to the invention are believed to result from the following improved qualities: great resistance to the corrosive effects of the constituents of the commercial glasses utilized, great resistance to the erosive effect of such glass, high creep resistance, high tensile strength at the elevated temperature of operation, high resistance to oxidation in the oxidizing atmosphere of operation.

I claim:

A process for fabricating a centrifuge for forming molten glass streams at high temperature and high rotary speed comprising the steps of casting a hollow blank having a generally cylindrical peripheral wall, an inwardly conical return and support wall intergral therewith and joining said cylindrical wall at one edge thereof, from an alloy consisting of from about 58 to 79 percent of a combination of nickel and chromium, with nickel comprising from about 60 to about 66 percent of such combination, and the remainder of said alloy consisting of about 0.4 to 0.6 percent carbon, about 1.0 to 1.15 percent silicon, about 1 percent manganese, about 1.0 to 6.0 percent of a strengthener which includes at least one element selected from the group consisting of molybdenum and tungsten and the balance iron; machining said blank after cooling to fit mounting means therefor; heat treating said blank at about 1800° F. for twenty-four hours followed by air quenching for modifying complex primary carbides and homogenizing said alloy; drilling a multiplicity of radial orifices through the generally cylindrical wall of said blank; and heat treating said blank at approximately 2250–2300° F. for one hour followed by air quenching for stabilizing said alloy and imparting thereto about 5–10 percent ductility at room temperature; the finished centrifuge having a Rockwell B hardness of about 87 to 90.

References Cited in the file of this patent

UNITED STATES PATENTS

| | | |
|---|---|---|
| 1,492,567 | Langenberg | May 6, 1924 |
| 2,798,827 | Hanink | July 9, 1957 |
| 2,875,109 | Carter et al. | Feb. 24, 1959 |